(12) United States Patent
Takimoto

(10) Patent No.: US 10,262,233 B2
(45) Date of Patent: Apr. 16, 2019

(54) IMAGE PROCESSING APPARATUS, IMAGE PROCESSING METHOD, PROGRAM, AND STORAGE MEDIUM FOR USING LEARNING DATA

(71) Applicant: CANON KABUSHIKI KAISHA, Tokyo (JP)

(72) Inventor: Masafumi Takimoto, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/993,341

(22) Filed: Jan. 12, 2016

(65) Prior Publication Data

US 2016/0210535 A1    Jul. 21, 2016

(30) Foreign Application Priority Data

Jan. 16, 2015  (JP) ................................ 2015-006899

(51) Int. Cl.
*G06K 9/62* (2006.01)

(52) U.S. Cl.
CPC ......... *G06K 9/6231* (2013.01); *G06K 9/6256* (2013.01); *G06K 9/6262* (2013.01)

(58) Field of Classification Search
CPC ...... G06N 3/0454; G06N 3/08; G06N 99/005; G06N 3/02; G06F 19/24; G06K 9/6256; G06K 9/00228; G06K 9/6267
See application file for complete search history.

(56) References Cited

U.S. PATENT DOCUMENTS

| | | | | |
|---|---|---|---|---|
| 2005/0102246 | A1* | 5/2005 | Movellan | G06K 9/00248 706/12 |
| 2009/0232403 | A1* | 9/2009 | Waragai | G06K 9/00228 382/209 |

(Continued)

FOREIGN PATENT DOCUMENTS

| | | |
|---|---|---|
| JP | 2004213567 A | 7/2004 |
| JP | 2006292615 A | 10/2006 |
| JP | 5335536 B2 | 11/2013 |

OTHER PUBLICATIONS

Notification of Reasons for Refusal issued by the Japanese Patent Office dated Feb. 5, 2019 in corresponding Japanese Patent Application No. 2015-006899, with English translation.

*Primary Examiner* — Vu Le
*Assistant Examiner* — Guillermo M Rivera-Martinez
(74) *Attorney, Agent, or Firm* — Carter, DeLuca & Farrell LLP

(57) ABSTRACT

The presence of possibility of occurrence of an excessive adaptation due to use of only learned training data is detected during a learning stage. The user is urged to add data and other information, thereby avoiding the excessive adaptation. For this purpose, the invention has: an inputting unit for inputting a learning image; a generating unit for generating a discrimination model used to decide whether or not a target is normal on the basis of the learning image; a deciding unit for deciding whether or not the number of input learning images is insufficient when the discrimination model is generated; and a notifying unit for notifying a message for urging the user to add the learning image when it is decided that the number of input learning images is insufficient.

13 Claims, 10 Drawing Sheets

(56) References Cited

U.S. PATENT DOCUMENTS

| | | | | |
|---|---|---|---|---|
| 2010/0272351 | A1* | 10/2010 | Kato | G06K 9/00986 |
| | | | | 382/159 |
| 2011/0158536 | A1* | 6/2011 | Nakano | G06K 9/00281 |
| | | | | 382/190 |
| 2015/0134583 | A1* | 5/2015 | Tamatsu | G06N 3/08 |
| | | | | 706/25 |

\* cited by examiner

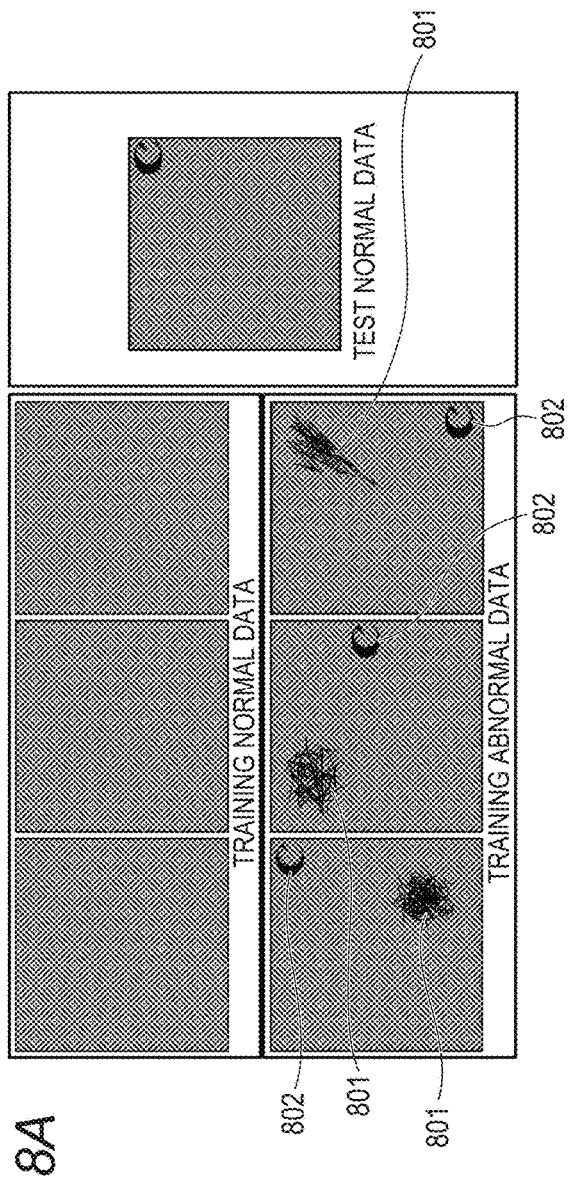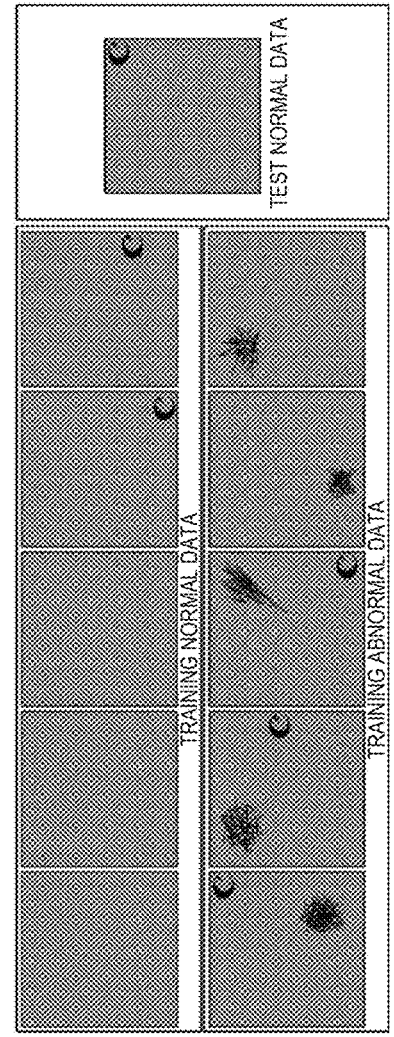
FIG. 8A
FIG. 8B

NUMBER OF TRAINING DATA

NUMBER OF TRAINING DATA

IMAGE PROCESSING APPARATUS, IMAGE PROCESSING METHOD, PROGRAM, AND STORAGE MEDIUM FOR USING LEARNING DATA

BACKGROUND OF THE INVENTION

Field of the Invention

The present invention relates to an information processing apparatus, an information processing method, a program for realizing the information processing method, and a storage medium storing the program.

Description of the Related Art

When data is analyzed or in a recognition problem in which whether or not new data has a nature belonging to learned data is decided by a discriminator which has learned by using a plurality of data, there is a case where a problem called excessive adaptation (overadaptation, overlearning) occurs. The excessive adaptation occurs when an amount of data to be learned is smaller than a height of degree of freedom of a model to be learned and corresponds to a state where although such data has been learned to training data, it cannot be adapted to unknown data and general-purpose performance is insufficient.

The excessive adaptation will now be described with reference to FIGS. 14A to 14F. FIGS. 14A to 14F are diagrams illustrating such a phenomenon that the smaller the number of training data is, the more it is difficult to learn a correct model. To such a problem that distribution of training data is learned by arbitrary discriminators, states where the number of training data in a feature space is increased to 6, 23, and 617 are visualized and illustrated in order of FIGS. 14A, 14B, and 14C, respectively. FIGS. 14D, 14E, and 14F illustrate states where models which estimated distribution of training data obtained by learning from the training data have been visualized, respectively.

The model learned from the training data illustrated in FIG. 14A is illustrated in FIG. 14D. The model learned from the training data illustrated in FIG. 14B is illustrated in FIG. 14E. The model learned from the training data illustrated in FIG. 14C is illustrated in FIG. 14F. The training data illustrated in FIG. 14C is shown as an example in the case where there are sufficient training data as compared with distribution of estimation targets. FIGS. 14A and 14B illustrate examples of a case where the training data is insufficient. Unlike the model illustrated in FIG. 14F, it will be understood that the models which were estimated by the insufficient training data and illustrated in FIGS. 14D and 14E have already learned narrow areas and could not correctly learn. If test data is classified on the basis of such wrong models, a classification error occurs.

As a method of avoiding the excessive adaptation, the following methods have been known: (1) a method of reducing parameters of the model to be learned; (2) a method of introducing a normalized term; (3) early stopping of a modeling calculation; and the like. According to the method of (1) mentioned above, by setting a learning model to a relatively simple model which can be defined by the small number of parameters or by setting several parameters to fixed values, such a situation that a model which is largely deviated from true distribution that is derived by few data can be avoided.

According to the method of (2) mentioned above, in a model such as a logistic recurrence or support vector machine, that is, in a model using weights to feature amounts, upon modeling, by adding the normalized term to an error function serving as a target of minimization, a complexity degree and a degree of freedom of the model can be suppressed. According to the method of the early stopping of the modeling calculation of (3) mentioned above, by stopping the learning before the model is excessively adapted to the training data, the general-purpose performance is raised.

The foregoing methods of (1), (2), and (3) have the following problems. For example, in the method of (1), although it is necessary to previously know a state or the like of the distribution of the data, it is a rare case that the state of the distribution of the data has previously been known, and it lacks in multiplicity of use. If information regarding the distribution of the data which has previously been obtained is wrong, a possibility that a model which is largely deviated from the true distribution is estimated is high. In the normalized parameters in (2), although an extent of adaptation to the training data can be controlled, if the adaptation to the training data is enhanced, a risk of occurrence of the excessive adaptation rises, and if a restriction by the normalization is enhanced, the model is away from the adaptation to the training data, so that it becomes inefficient. In (3) as well, similarly, if the stopping of the trailing is performed too much, the adaptation to the training data becomes too strong, a risk of occurrence of the excessive adaptation rises, and if the stopping of the trailing is too early, the model is far away from the true model.

As a method of selecting proper parameters in the foregoing methods of (1), (2), and (3), there is a method whereby a part of the trailing data is separately fetched in order to measure a degree of goodness of the model obtained after the trailing and is not used for trailing but is used as data for verification, thereby verifying. For example, according to the method of (3), by verifying the performance by the data for verification by using the model learned by the data fetched for training, a start of occurrence of the excessive adaptation is detected and the training can be stopped. According to the methods of (1) and (2) as well, parameters are similarly searched for and good parameters properly adapted to the training data can be selected while avoiding the excessive adaptation.

As a method of detecting the occurrence of the excessive adaptation and suppressing it, for example, the technique disclosed in Japanese Patent No. 5335536 has been proposed. According to such a method, in the case of learning by using a plurality of weak discriminators, the excessive adaptation is detected from a change in evaluated values to the weak discriminators and learning data is added, thereby coping with the excessive adaptation.

By installing the mechanisms for avoiding the excessive adaptation described in the foregoing methods of (1), (2), and (3), a deterioration in precision caused by the insufficient information can be minimized. However, information regarding the information of the distribution which could not be obtained because an amount of data is substantially small cannot be compensated. In dependence on a use form in an application such as an external appearance inspection or the like, there is a case where it is demanded that not only by the countermeasures against the excessive adaptation as mentioned above but also by notifying the user of a fact that the data is insufficient, the good discriminating ability can be obtained while keeping an expressing ability of the discriminator as much as possible.

SUMMARY OF THE INVENTION

According to an aspect of the invention, for example, there is provided an information processing apparatus comprising: an inputting unit configured to input a learning image; a generating unit configured to generate a discrimination model which is used to decide whether or not a target is normal on the basis of the learning image; a deciding unit configured to decide whether or not the number of learning images which were input is insufficient when the generating unit generates the discrimination model; and a notifying unit configured to notify the user of information for urging an addition of the learning image when it is decided by the deciding unit that the number of learning images which were input is insufficient.

According to the aspect of the invention, such a situation that there is a possibility that an excessive adaptation occurs if only learned training data is used is detected during a stage of learning and the user is urged to add data or add other information, thereby enabling the excessive adaptation to be avoided.

Further features of the present invention will become apparent from the following description of exemplary embodiments with reference to the attached drawings.

BRIEF DESCRIPTION OF THE DRAWINGS

FIGS. 8A and 8B are diagrams illustrating an example of training data in which an excessive adaptation is liable to occur and an example of training data in which an excessive adaptation is difficult to occur.

DESCRIPTION OF THE EMBODIMENTS

Preferred embodiments of the present invention will now be described in detail in accordance with the accompanying drawings.

First Embodiment

Figure 1:
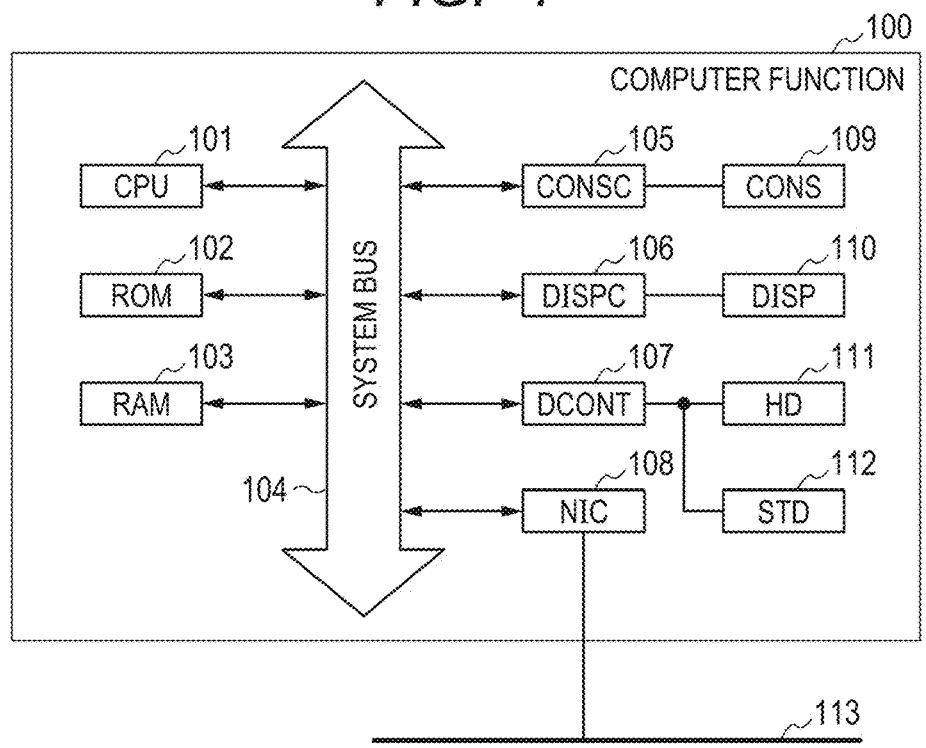
FIG. 1 is a diagram illustrating a computer function which can realize an information processing apparatus in an embodiment.

The first embodiment of the invention will now be described. FIG. 1 is a block diagram illustrating a computer function which can realize an information processing apparatus in the embodiment of the invention. For example, the information processing apparatus in the embodiment has a computer function 100 as illustrated in FIG. 1 and the operation in each embodiment, which will be described hereinbelow, is executed by a CPU 101.

As illustrated in FIG. 1, the computer function 100 has the CPU 101, a ROM 102, and a RAM 103. The computer function 100 also has: a controller (CONSC) 105 of an operating unit (CONS) 109; and a display controller (DISPC) 106 of a display (DISP) 110 as a displaying unit such as an LCD or the like. Further, the computer function 100 has: a controller (DCONT) 107 of a hard disk (HD) 111 and a storage device (STD) 112 such as a flexible disk or the like; and a network interface card (NIC) 108. Those function units 101, 102, 103, 105, 106, 107, and 108 are connected so that they can communicate with each other through a system bus 104.

By executing software stored in the ROM 102 or HD 111 or software which is supplied from the STD 112, the CPU 101 unitedly controls each constructing unit connected to the system bus 104. That is, the CPU 101 reads out a processing program for executing the operation as will be described hereinafter from the ROM 102, HD 111, or STD 112 and executes, thereby making control for realizing the operation in the embodiment of the invention. The RAM 103 functions as a main memory, a work area, or the like of the CPU 101.

The CONSC 105 controls an input of an instruction from the CONS 109. The DISPC 106 controls a display of the DISP 110. The DCONT 107 controls an access to the HD 111 and STD 112 for storing a boot program, various kinds of applications, a user file, a network managing program, processing programs for realizing the operation in each embodiment, and the like. The NIC 108 bidirectionally transmits and receives data to/from other apparatuses connected to a network 113.

Figure 2:
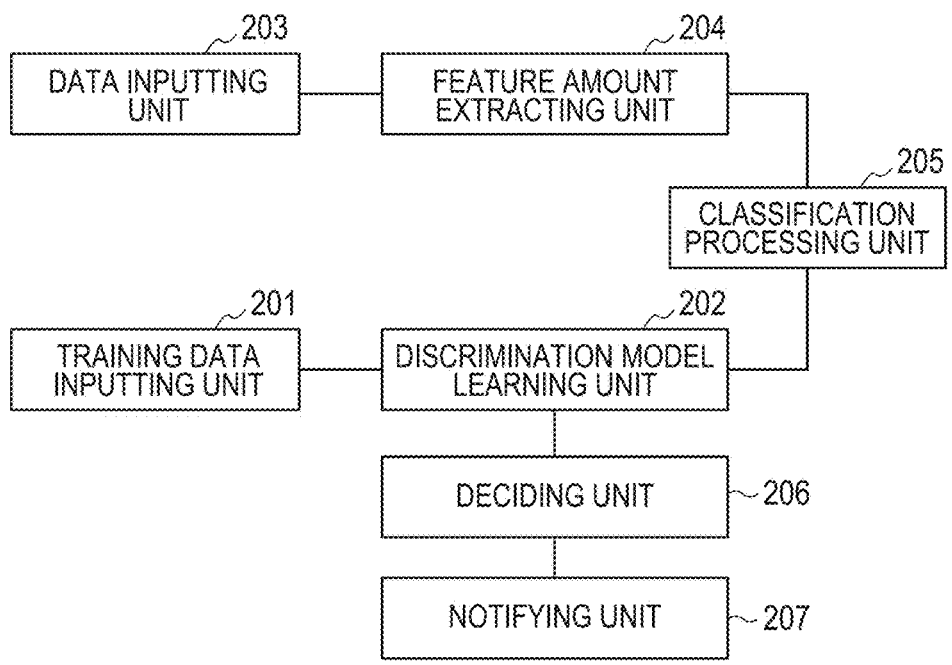
FIG. 2 is a diagram illustrating an example of a construction of the function of the information processing apparatus in the embodiment.

FIG. 2 is a block diagram illustrating an example of a construction of the function of the information processing apparatus in the embodiment. In FIG. 2, only characteristic elements among the function units held by the information processing apparatus in the embodiment are illustrated. The information processing apparatus in the embodiment has a training data inputting unit 201, a discrimination model learning unit 202, a data inputting unit 203, a feature amount extracting unit 204, a classification processing unit 205, a deciding unit 206, and a notifying unit 207.

The discrimination model learning unit 202 performs a machine learning on the basis of training data (for example, training image data) which is input from the training data inputting unit 201 and relates to a target to be classified, thereby learning a model to classify the target. The feature amount extracting unit 204 extracts feature amounts from data (for example, image data) which is input from the data inputting unit 203. The classification processing unit 205 classifies whether or not the input data has a nature belonging to the learned data on the basis of the feature amounts extracted by the feature amount extracting unit 204 and the model learned by the discrimination model learning unit 202.

At the time of training (at the time of learning), the deciding unit 206 decides whether or not the training data and information regarding such data are insufficient in the machine learning in the discrimination model learning unit 202. In other words, at the time of training, the deciding unit 206 decides whether or not there is a possibility that the excessive adaptation occurs when only the training data which has already been learned is used in the machine learning in the discrimination model learning unit 202. If it is decided by the deciding unit 206 that the training data and the information regarding such data are insufficient, the notifying unit 207 notifies the user of a message for urging an addition of training data and information regarding such data.

The first embodiment will be specifically described hereinbelow. The first embodiment relates to a method of detecting whether or not there is a possibility of occurrence of the excessive adaptation on the basis of a plurality of data sets sampled from the training data.

As an example, there is considered such a specific problem that, in an external appearance inspecting apparatus, an image is input, feature amounts are extracted from the input image, and whether the input image is normal data or abnormal data is classified on the basis of the extracted feature amounts. It is now assumed that in order to obtain a good classifying precision, a plurality of training normal images and a plurality of training abnormal images for inspection of an external appearance are prepared by the user, and a set of feature amounts and the like suitable to classify the normal data and the abnormal data are learned from the input image by using such a plurality of training image sets.

It is assumed that the number of feature amounts which are extracted from the image at the time of learning is equal to N (N is a natural number). It is assumed that the N feature amounts which are extracted at the initial stage is a sufficient number of feature amounts in each of the following embodiments. It is assumed that nothing is considered about a problem which is caused since the N extracted features are insufficient for the classification problem. It is assumed that, among the N feature amounts, the number of sets of feature amounts which are significant to separate the normal data and the abnormal data is fairly smaller than N and is equal to M (M is a natural number: M<N). That is, if true distribution of the normal data and the abnormal data has been known, it is assumed that the sets of feature amounts which become a correct solution to separate those two classes can be defined in a space which is expressed by the M feature amounts. It is assumed that feature amount discrimination IDs (1 to N) have been allocated to the N feature amounts in order to discriminate the feature amounts, respectively.

Figure 3A:
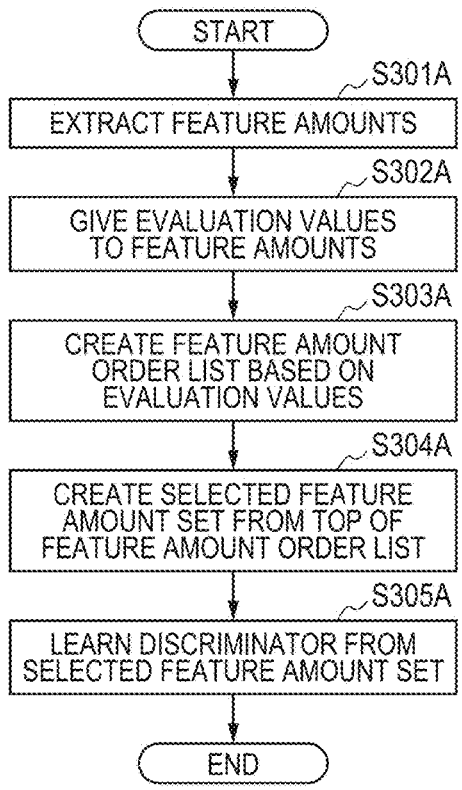
FIGS. 3A, 3B, and 3C are flowcharts illustrating an example of learning steps in the embodiment.

By the above setting, the discrimination model learning unit 202 selects the feature amount set adapted to separate the normal data and the abnormal data and learns a discrimination model by learning steps illustrated in FIG. 3A. First, in step S301A, all of the N feature amounts are extracted from all of the training images. Subsequently, in step S302A, the feature amounts are converted into scores by using a separation degree of the training normal data and the training abnormal data as a reference, and evaluation values are given to all of the N feature amounts. Subsequently, in step S303A, a feature amount order list is created by sequentially allocating order of the first order to the Nth order from the best feature amount on the basis of the evaluation values given in step S302A. Then, in step S304A, one feature amount, two feature amounts, and d feature amounts are selected from the top of the feature amount order list. In step S305A, a discriminator for most correctly separating the normal data and the abnormal data is learned by using the selected feature amount set.

Figure 3B:
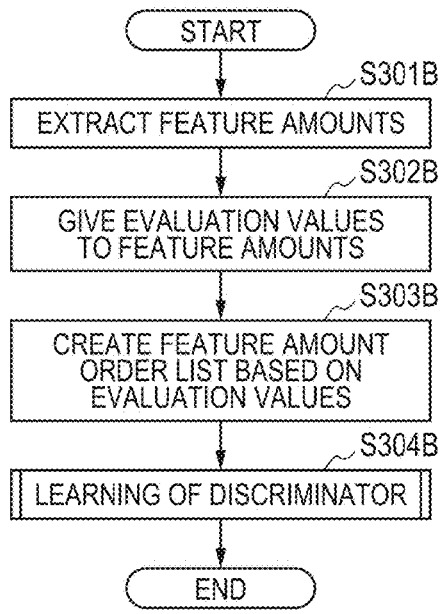
Figure 3C:
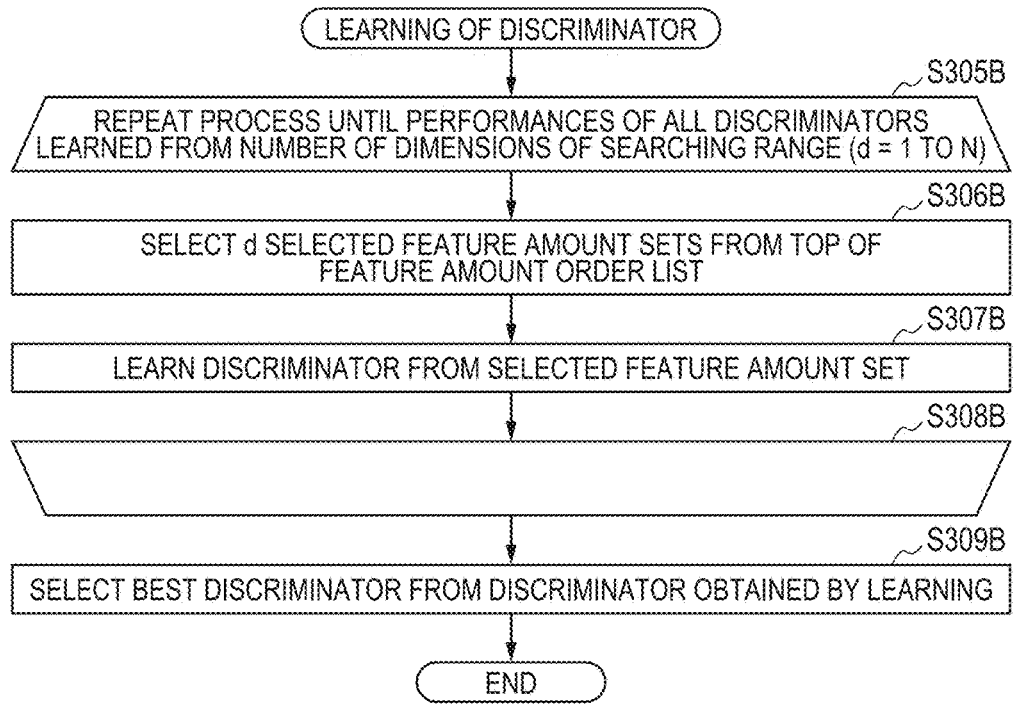

The discriminator in which the best performance could be obtained among the discriminators estimated by the foregoing series of learning is set to the discriminator to be obtained this time. Flowcharts showing in detail processing steps for more effectively executing steps S304A and S305A in FIG. 3A are illustrated in FIGS. 3B and 3C. That is, in steps S301B to S303B, processes similar to those in steps S301A to S303A illustrated in FIG. 3A are executed, and in step S304B, a process for learning the discriminator illustrated in FIG. 3C is executed.

In the process for learning the discriminator illustrated in FIG. 3C, a value of d is sequentially changed from 1 to N and processes in steps S305B to S308B are repeated until performances of all discriminators which are learned from the number of dimensions of a searching range are obtained. That is, processes for selecting the d feature amounts from the top of the feature amount order list (S306B) and learning the discriminators by using a set of the selected feature amounts (S307B) are repeated. In S309B, the best discriminator which most correctly separates the normal data and the abnormal data is selected from the discriminators obtained by the learning.

Although the foregoing procedure is shown as a simple processing flow, the invention provides it as a method which shows a significant effect even to such a simple learning flow and does not depend on an algorithm. In order to further clarify the description contents hereinbelow, it is assumed that the discriminator which is used is defined by a CLAFIC method (CLAss-Featuring Information Compression method). Such a discriminator that a partial space regarding the normal data is defined by the CLAFIC method and it is decided that data which is away from a defined normal area by an arbitrary distance or longer is abnormal data is now considered. That is, a method of obtaining a solution by defining only the normal partial space without defining the partial space of two classes although it is a discrimination of two classes for separating the normal data and the abnormal data is used. Therefore, in the specific learning algorithm which is considered in the embodiment, main parameters to be learned are the number of selected features, a selected feature list, the number of dimensions of the partial space, and a projection matrix.

In the external appearance inspecting apparatus for performing the learning by the foregoing flowcharts, the number of training data which is necessary when learning is an important problem. Generally, the more the problem is difficult, the larger number of data is necessary, and the simpler the problem is, good performance is provided even if the few data is used. A degree of difficulty of the problem can be judged by a degree of similarity between the classes as classification targets, or the like.

However, it is not easy that the user who uses the external appearance inspecting apparatus sufficiently understands the algorithm of the apparatus, previously knows the difficulty of the problem to the algorithm, and prepares the proper number of data. Ordinarily, the smaller the number of training data is, the learning is not correctly performed and it is, therefore, desirable that the number of training data is large. However, since the number of parameters which define the discriminator which is used when estimating the model is limited, even if the number of training data is increased or even if the training data of the number larger than a predetermined value is given, the performance of the discriminator is not improved more than the initial performance.

Therefore, whether or not the number of present data is sufficient can be decided by knowing the approximate number of proper data on the basis of the difficulty of the classification targets and the complexity of the discrimination model which has previously been estimated. Particularly, although there is no problem when the number of training data is sufficient, if it is insufficient, a possibility that the correct decision cannot be made is high. Therefore, when the number of training data is insufficient, by issuing a message showing that it is necessary to supplement data, it is necessary to notifying the user of a fact that there is a possibility of occurrence of the excessive adaptation when only the present training data is used and the good performance cannot be obtained.

Figure 4:
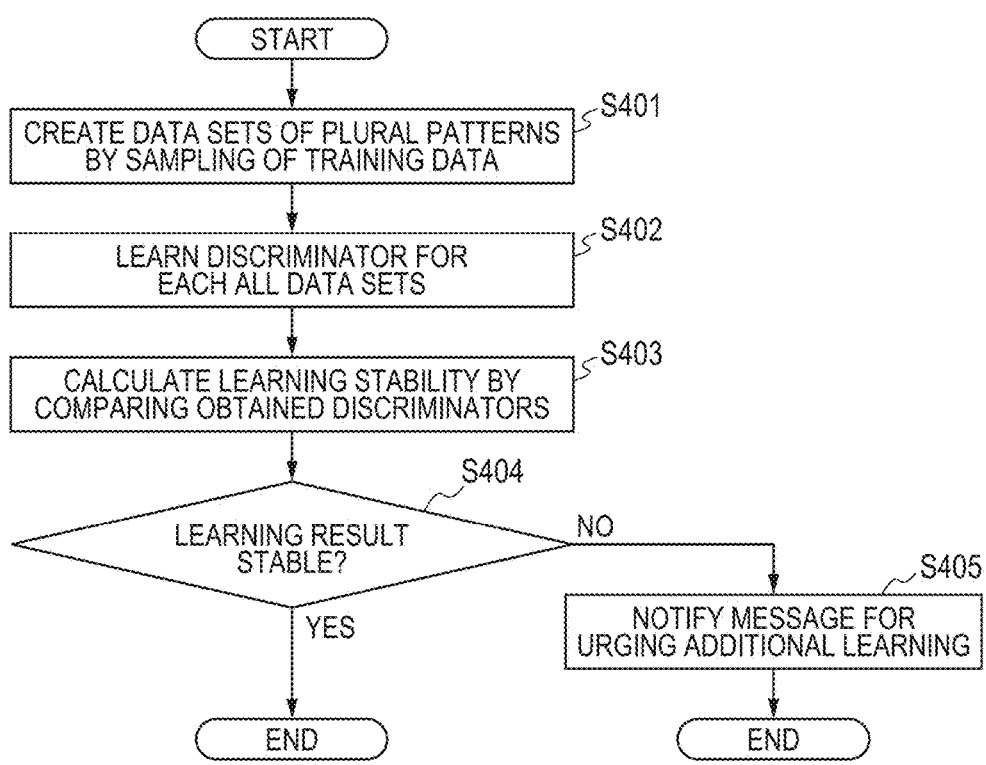
FIG. 4 is a flowchart illustrating an example of the processing operation in the first embodiment.

First, according to one of such methods, S ($S=\lambda T$, $0.5 \leq \lambda < 1.0$) data is sampled from a set of all T training data without permitting an overlap to thereby create a partial data set and a plurality of (up to $_T C_S$) partial data sets are prepared, thereby detecting. A processing flow for such a method is illustrated in FIG. 4. FIG. 4 is a flowchart illustrating an example of the processing operation in the first embodiment. In step S401, the discrimination model learning unit 202 samples a part of the data from the set of training data without permitting an overlap, thereby creating a data set of a plurality of patterns. In step S402, the discrimination model learning unit 202 learns a discriminator for each created all data sets. The deciding unit 206 compares the discriminators obtained by the learning and calculates a learning stability in step S403 and decides whether or not a learning result of the discriminator is stable on the basis of the calculated learning stability in step S404. In other words, whether or not the learning result of the discriminator is stable is decided on the basis of a similarity of the model obtained by the learning. Thus, if it is decided that the learning result of the discriminator is not stable, in step S405, a message for urging an additional learning (addition of training data) is notified by the notifying unit 207.

In the foregoing process, since it is necessary to set a value of S on the assumption that the nature of the distribution of the T training data is almost succeeded, it is desirable to set a value of $\lambda$ to a value near 1 as close as possible. In this instance, a description will be made by presuming a case of $\lambda=0.95$. Since the larger the number of variations of the sampling is, the better the result is, it is now assumed that the $_T C_S$ partial data sets were obtained by the sampling method. By learning in accordance with the foregoing processing flow for each data set of the partial data sets, $_T C_S$ models each corresponding to each data set are estimated. A parameter set which defines the $_T C_S$ models estimated here is obtained.

Figure 5A:
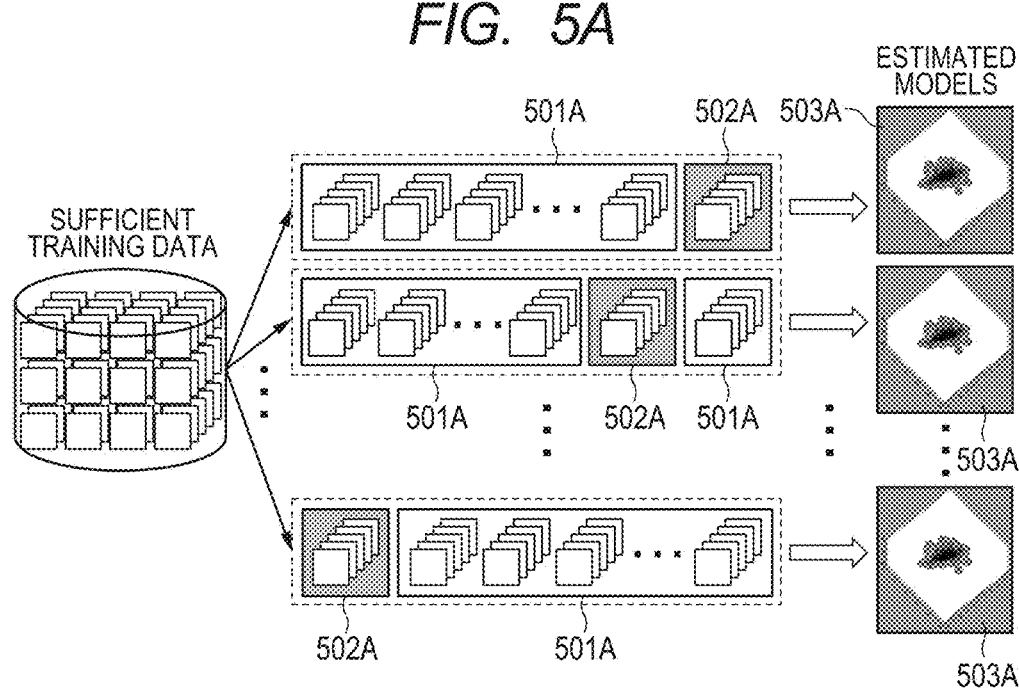
FIGS. 5A and 5B are diagrams for describing models which are estimated in accordance with the number of training data.

If $T=\infty$ and the number of parameter sets for defining the models which are estimated is limited, the models which are learned by each data set obtained here are almost the same model and it can be said that the learning result is qualitatively stable. Although it is assumed that $T=\infty$ in this example, actually, since the number of parameter sets for defining the models is limited, there is such a limitation that if the value of S is equal to a predetermined value or more, a slight difference between the data sets cannot be fully expressed by the models. Therefore, in order to obtain the stable model, it is not always necessary that $T=\infty$ and by setting the value of T to a practical value, the stable model can be similarly obtained. At this time, a state where the models which are estimated from each training data are almost the same model is illustrated in FIG. 5A. In the example illustrated in FIG. 5A, since the sufficient number of training data exist, even if data 501A which is used for learning and data 502A which is not used for learning are changed, an estimated model 503A is stable and a similar model is obtained.

Figure 5B:
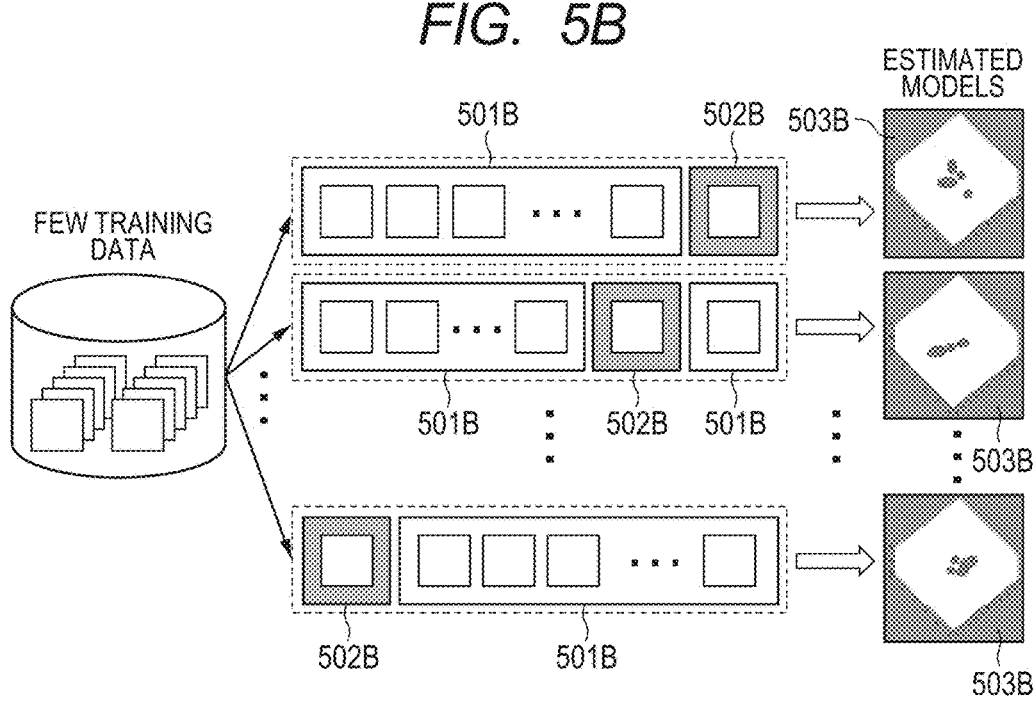

On the contrary, when the value of T is extremely smaller than a degree of freedom of the parameter set for defining the model to be estimated, a possibility that a large deviation occurs in each of the $_T C_S$ data sets rises. Therefore, a large difference qualitatively occurs in the models estimated from each training data. A state where the large difference occurs in the models estimated from each training data is illustrated in FIG. 5B. In the example illustrated in FIG. 5B, since the number of training data is small, if data 501B which is used for learning and data 502B which is not used for learning are changed, an estimated model 503B changes largely in accordance with the data 501B which is used for learning.

Therefore, if the model estimated from the sampled data set becomes the estimated model close to the true distribution for the model used as a prerequisite, the models learned from the sampled sets are close models. Consequently, it is possible to judge that the value of T (the number of training data) is sufficiently large for the model in which the learning is performed as a prerequisite. When the models estimated from the sampled data sets are largely different, it will be understood that the value of T (the number of training data) is insufficient for the learning.

Therefore, whether the model estimated from the sampled data set is stable or unstable can be detected by comparing parameter vectors which define the estimated model. Although several methods are considered as a detecting method, it is assumed that an instability degree score is set from the parameter set which defines the estimated model. How to define a distance between the models is largely concerned with performance for detecting whether the data is sufficient or insufficient. In the embodiment, a good result is obtained by defining as follows.

In order to define the distance determined by the two models obtained by the learning, those models are called "model i" and "model j" and the distance between the models defined by the two models is expressed by dist(i,j). dist(i,j) is defined by the following vectors. First, as a result of the learning performed by the foregoing method, N-dimensional vectors $V_i$ and $V_j$ which are defined as follows are created from selected features of the model i and the model j, respectively. Elements corresponding to each of the N dimensions sequentially correspond to the discrimination IDs (1 to N) of the extracted features. When each element is selected in each model, it is expressed by "1". When each element is not selected, it is expressed by "0".

Although it is presumed that a value of N is equal to a sufficiently large number, a case where N=11 is now considered in order to simply describe. In the model i, if it has been learned that there are five features in which the IDs of the feature amounts suitable to separate the normal data and the abnormal data from the extracted features are equal to 1, 3, 5, 10, and 11, $V_i=(1, 0, 1, 0, 1, 0, 0, 0, 0, 1, 1)$. In the model j, if it has been learned that there are five features in which the IDs of the feature amounts suitable to separate the normal data and the abnormal data are equal to 1, 5, 8, 10, and 11, $V_j=(1, 0, 0, 0, 1, 0, 0, 1, 0, 1, 1)$.

Subsequently, the numbers of dimensions at the time when the partial space dimension showing the distribution of the normal data has been learned by the CLAFIC method from the selected features are set to $Cd_i$ and $Cd_j$ and it is assumed that $Cd_i=2$ and $Cd_j=4$. At this time, in order to define dist(i,j), elements of the numbers of dimensions are coupled with $V_i$ and $V_j$ to thereby newly create $V_i'$ and $V_j'$. A distance between those two vectors is determined by a Hamming distance. That is, since $V_i'$=(1, 0, 1, 0, 1, 0, 0, 0, 0, 1, 1, 2) and $V_j'$=(1, 0, 0, 0, 1, 0, 0, 1, 0, 1, 1, 4), the Hamming distance is equal to 3.

Since the maximum Hamming distance in the case where the two models differ mostly is equal to 12, if the distance between the models is defined as a Hamming distance/maximum Hamming distance in order to normalize the distance between the models to a value within a range from 0 to 1, dist(i,j)=0.25. Although the distance between the models is defined based on the Hamming distance here, any element may be used so long as it can define a distance between two numeral trains. Although only the distance between the model i and the model j is considered here, in order to accumulate the distances (absolute values of the differences) among all of the $_TC_S$ estimated models and set to an instability degree score, an instability degree score "Score" is defined as follows.

$$\text{Score} = \frac{\sum_{i=1}^{_TC_S} \sum_{j=i+1}^{_TC_S} \text{dist}(i, j)}{(_TC_S)C_2} \quad (1)$$

This score Score is used as an index to discriminate whether or not the data is sufficient on the basis of its value. If the value of the score Score is small, it can be decided that the models are similar models. The larger the value of the score Score is, it can be decided that the learned models differ.

As another element, a score of a precision base may be used as an index which can define the stability of the learned model more simply than the accumulated score of the distances among the models. In the case of using the score of the precision base, there is no need to define the distance between the models and the score is calculated by the following procedure.

Although a data set for training is created by extracting S data from a set of all T training data without permitting an overlap, a data set for verification is created by unselected (T−S) data with respect to each data set. Therefore, a classification error rate by the model learned by the S data is calculated by the remaining (T−S) data for verification. A classification error rate of the model i is called Error(i) and is used as an index of performance of the model i. For example, the classification error rate Error(i) at the time when the classification of the U (0≤U≤(T−S)) among the (T−S) data for verification has erroneously been performed is calculated as U/(T−S). That is, the classification error rate is set in such a manner that when correct solutions are obtained with respect to all of the data for verification, the classification error rate is equal to 0, and when classification results of all data is wrong, the classification error rate is equal to 1. The classification error rates by all of the $_TC_S$ learned models are obtained and a mean value is obtained as follows. Thus, such a mean value can be used as a score Error for deciding whether the given training data sets are sufficient or insufficient.

$$\text{Error} = \frac{1}{_TC_S} \sum_{i=1}^{_TC_S} \text{Error}(i) \quad (2)$$

It will be understood that when a value of the score Error in the above equation (2) is large, there is such a tendency that the model learned by the S data excluding the verification data changes largely. It can be decided that a possibility that the training data is insufficient is high. When the training data is sufficient, it can be decided that there is such a tendency that even if the verification data is excluded and the learning is performed, the model is stable and the high performance is held. Although the two kinds of scores adapted to decide sufficient/insufficient of the training data have been described above, a score defined by a combination of them may be used. In such a case, a sum of two scores may be simply used as a score which is used for decision.

An example of the score for deciding sufficient/insufficient of the training data has been described above. The data sampling method is not limited to the foregoing subsampling method but any method (for example, bootstrap method, jack-knife method) may be used so long as it is a method whereby several data in the learned data set are selected, a plurality of patterns of the data sets are created, and the learning is performed.

Figure 6:
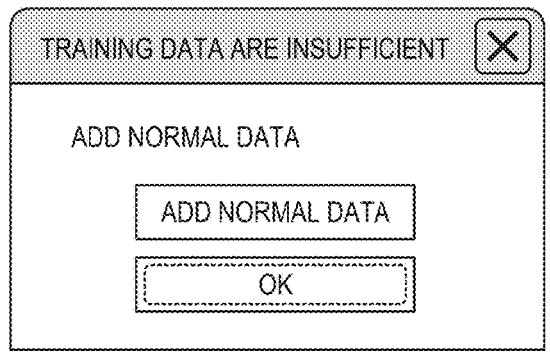
FIG. 6 is a diagram illustrating an example of a message which is displayed when it is detected that training data is insufficient in the first embodiment.

Sufficient/insufficient of the training data is decided on the basis of the score obtained as mentioned above, and when it is decided that the training data is insufficient, for example, a message as illustrated in FIG. 6 is displayed. Thus, when a fact that there is a possibility that an excessive adaptation occurs when only the learned training data is used is detected during the training stage, it is possible to urge the user to add training data. By receiving the training data added by the user and further performing the learning, the excessive adaptation can be avoided and the classifying precision can be improved.

A further fine instruction can be also issued by using the result obtained at the time of calculation of the score. For example, a mean value of the distances from each model to other models is used as an instability degree model of each model and is defined as shown by the following equation (3).

$$\text{Score}(i) = \frac{1}{_TC_S - 1} \sum_{j=1, j \neq i}^{_TC_S} \text{dist}(i, j), \, i = 1, 2, 3 \ldots \, _TC_S \quad (3)$$

Figure 7A:
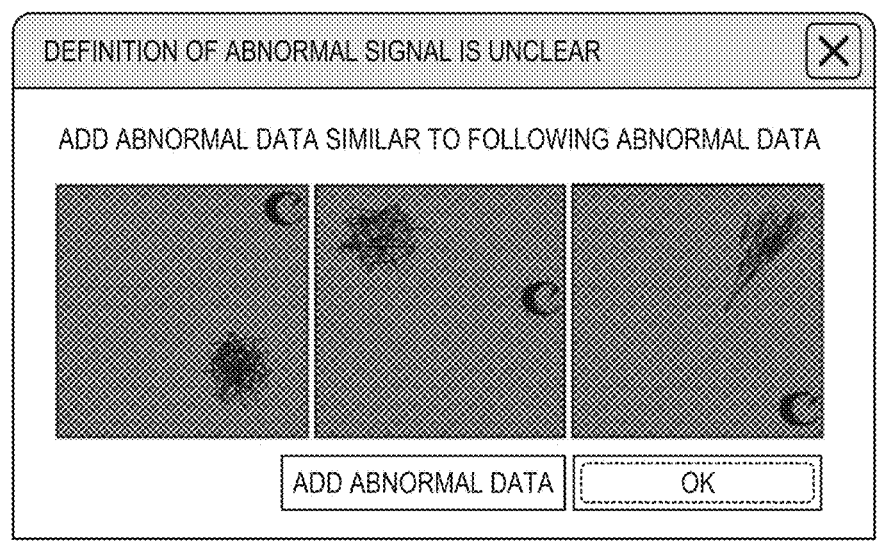
FIGS. 7A and 7B are diagrams illustrating another example of a message which is displayed when it is detected that training data is insufficient in the first embodiment.
Figure 7B:
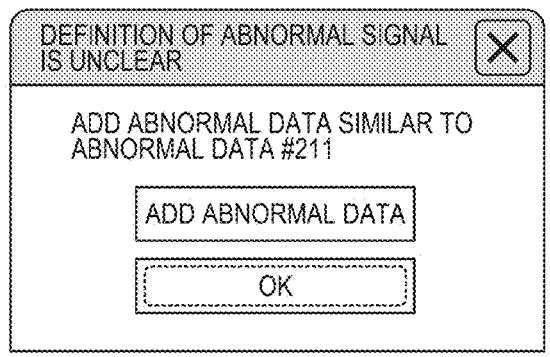

It is considered that although the score Score(i) calculated by the equation (3) is maximum among all "i", a possibility that the data having such a tendency that it is insufficient in the training data is contained in the unselected (T−S) data in the training data set is high. Therefore, a message for urging the user to add training data similar to the unselected (T−S) data as illustrated in FIG. 7A is displayed. It is also possible to construct in such a manner that a plurality of data is sequentially extracted from the data of the largest score Score(i) among all "i", it is determined that the data which was not selected in common to those data sets is the data having such a tendency that it is insufficient in the training data, and a message as illustrated in FIG. 7B is displayed. By using such a method, it is possible to urge the user to add proper training data. Further, in place of the score Score(i) obtained by the equation (3), even if the classification error rate Error(i) obtained by the equation (2) calculated by a precision standard measured by the data for verification to each model is used, a similar decision can be performed.

Second Embodiment

Subsequently, the second embodiment of the invention will be described. The second embodiment relates to a method whereby whether or not there is a possibility of occurrence of an excessive adaptation is notified to the user by presenting a result on the way of training or after the training to the user, thereby avoiding. Points different from the foregoing first embodiment will be described hereinbelow.

Figure 9:
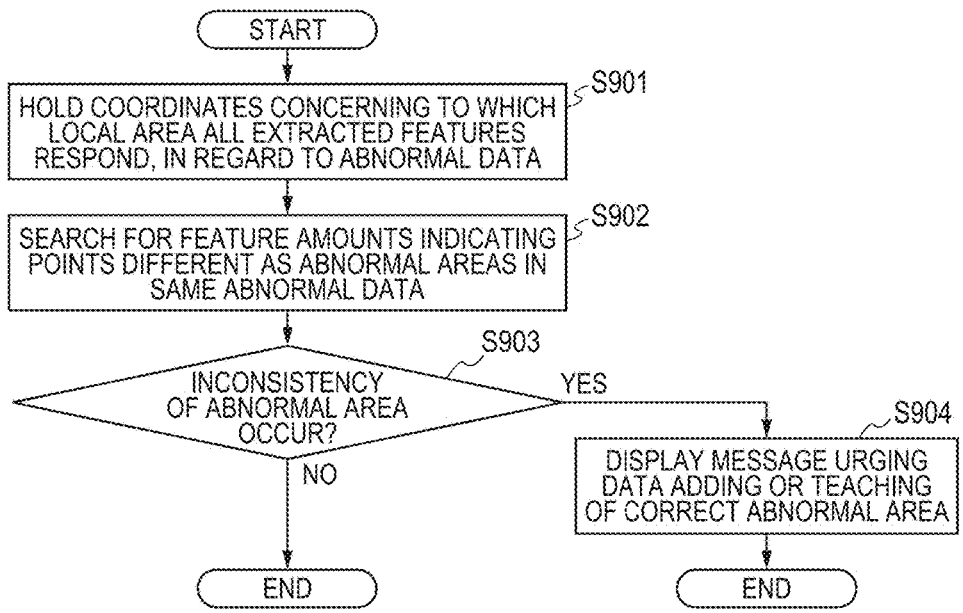
FIG. 9 is a flowchart illustrating an example of the processing operation in the second embodiment.

A problem setting is similar to that in the first embodiment. There is considered such a problem that, in an external appearance inspecting apparatus, an image is input, feature amounts are extracted from the input image, and whether the input image is normal data or abnormal data is classified on the basis of the extracted feature amounts. A fundamental processing algorithm is illustrated in FIG. 9. FIG. 9 is a flowchart illustrating an example of the processing operation in the second embodiment. In step S901, coordinates concerning to which local area all extracted features respond in regard to abnormal data are held. Subsequently, in step S902, feature amounts indicating points different as abnormal areas in the same abnormal data are searched for. In next step S903, consistency of the abnormal area, that is, whether or not inconsistency has occurred is decided. If the inconsistency of the abnormal area has occurred, in step S904, a message for urging an addition of training data or a teaching of a correct abnormal area is displayed.

Although the second embodiment can be applied together with the foregoing first embodiment, even if the subsampling is not used in particular, the invention can be embodied. As for each of the N feature amounts extracted from one input image, a statistic amount such as maximum value in the image, maximum luminance gradient in an arbitrary local area, or the like is used as a fundamental value, and it is assumed that each feature amount is held in a state where it is associated with coordinates concerning from which area in the image it has been extracted.

The excessive adaptation occurs frequently in the case where the class of a target to be classified is adapted to random features of the training data instead of the true feature to be separated. An example of a set of training data which gives such a typical case is illustrated in FIG. 8A. In FIG. 8A, while training normal data shown at an upper stage is a uniform pattern, all of three training abnormal data shown at a lower stage have abnormal areas 801 such as scratches, and further, a part 802 of logotypes printed on products is projected. In the case of giving the training data in this manner, a signal which is separated and detected from the distribution which is learned from the normal data is learned as an abnormal candidate area because not only a signal extracted from the scratch area but also feature amounts obtained from a logotype area are signals which do not exist in the normal distribution.

In this case, such an error that if normal data for testing in which although there are no scratches, logotypes are projected is input, it is detected as an abnormality occurs. It is an excessive adaptation which occurs as a result of such an operation that when teaching features for separating the true normal data and abnormal data, since the data is insufficient, a noise feature amount which responds to unrelated logotypes is selected when a discrimination model is learned. For example, if training data as illustrated in FIG. 8B is given, the excessive adaptation as mentioned above ought not to have occurred.

Although a very simple example has been shown here, if an amount of data is small in related to difficulty of the problem, a possibility that such a wrong learning is performed is high. If many learning data can be prepared, a possibility that an unbalance occurs in the data can be decreased, and wrong features are difficult to be selected. The following processes are executed as a method of detecting the possibility of the excessive adaptation. Those processes may be executed either on the way of the learning or after completion of the learning. In the embodiment, it is assumed that a fact that there is a possibility of occurrence of the excessive adaptation if only the training data set held at a point of time when a list of selection feature candidates has been obtained on the way of the learning is used is detected.

It is assumed that there are P training normal data and there are Q training abnormal data. In the embodiment, the invention can be applied to all algorithms which can introduce a mechanism for raising performance by deciding features which exert an adverse influence when a discrimination model for classifying the classification target is learned, and a multiplicity of use is high. However, in order to more clearly show the effects, an example of a learning algorithm will be described in detail hereinbelow. Naturally, the invention is not limited to such a setting example.

When the learning of the classification model is performed, in the first step, a separation degree of the training normal data and the training abnormal data is used as a reference and is converted into a score, orders of 1 to N are sequentially allocated to the N feature amounts from the best feature amount, and the same order is allocated to the feature amounts of the same separation degree. In this instance, the separation degree is defined as follows and is used for simplicity of description.

First, it is assumed that the distribution of the normal data is based on the normal distribution for each feature amount. In each feature amount, a mean value and a variance value of all training normal data are calculated. It is assumed that each feature amount is discriminated by a subscript f ($1 \leq f \leq N$) and the mean value is expressed by $\mu_f$ and the variance value is expressed by $\sigma_f^2$. Those values are used for definition of the normal distribution model in each feature. Therefore, a score to decide whether or not the input data is probably normal in each feature can be calculated.

Such a score of normality is called "NScore". Now, assuming that an observation value in an extracted feature f of input data X is set to $X_f$, the score of normality in the feature f of this data is obtained by the following equation (4). In the calculation of the score NScore, the distribution of the data in each feature amount is normalized by a set of ($\mu_f, \sigma_f^2$) and is converted so that a variance of the training normal data is set to 1.0 and a mean is set to 0.0. Also with respect to the training abnormal data and the test data, a similar process is executed by ($\mu_f, \sigma_f^2$) at the time of calculating the score of each feature amount.

$$NScore_{X_f} = \frac{1}{\sqrt{2\pi}} \exp\left(-\frac{(X_f - \mu_f)^2}{2\sigma_f^2}\right) \quad (4)$$

That is, the score of normality of the data existing at the center of the distribution of the normal data becomes maximum and the more the data is away from the center of the distribution, the score approaches 0 as much as possible. In this instance, since there are Q abnormal data, an abnormal data set is set to A and the respective abnormal data is discriminated by adding subscripts 1 to Q to them and is expressed as follows.

$$A = (A_1, A_2, \ldots A_Q) \qquad (5)$$

Assuming that in the N feature amounts, the scores are given by using the separation degree of normal/abnormal as a reference, a separation degree score $FScore_f$ of each feature f can be defined by the following equation (6).

$$FScore_f = 1 - \frac{\sqrt{2\pi}}{Q}\sum_{i=1}^{Q} NScore_{(A_i)_f} \qquad (6)$$

A value of the score $FScore_f$ showing the separation degree of each feature f lies within a range from 0 to 1 and the higher the score is, the better the feature is. Further, there is also a case where it is better to evaluate such a score by including the score of the training normal data. For example, when each feature amount is evaluated in the embodiment, it is assumed that the distribution of the normal data is based on unimodal normal distribution. However, since there is a case where, among the N feature amounts, there is a feature amount in which the normal data does not conform with the unimodal normal distribution, there is a case where a good result is obtained by reducing the evaluation of such a feature amount. Therefore, as shown in the following equation (8), the training normal data is used for calculation of the score $FScore_f$ and the score is defined in consideration of a degree of conformity of the actual normal data with the calculated normal data. It is assumed that the P normal data are discriminated by subscripts as shown in the following expression (7).

$$B = (B_1, B_2, \ldots B_P) \qquad (7)$$

$$FScore_f = 1 - \frac{P \sum_{i=1}^{Q} NScore_{(A_i)_f}}{Q \sum_{j=1}^{P} NScore_{(B_j)_f}} \qquad (8)$$

Orders are given to the N features on the basis of the value of the score $FScore_f$ obtained by the above equation (6) or (8). In a manner similar to the first embodiment, the d features are selected from the top order feature in order of the created scores and the model is learned from the selected feature set. As for the discrimination model, it is assumed that there is used a method whereby in a manner similar to the first embodiment, by obtaining the partial space which gives a good explanation to the distribution of the normal data by the CLAFIC method, the data which is away from the normal distribution by a predetermined distance is detected as an abnormality. By comparing performance of the learned models, the number of features to be selected is determined.

However, a list of the feature amounts arranged in order from the top order feature is determined by the evaluation based on only the separation degree reference. Therefore, the smaller the number Q of training abnormal data is, there is a possibility that the feature amount in which the abnormal data could be accidentally separated from the normal distribution by noises other than the signal which becomes a ground of abnormality is mixed. Therefore, the selected features are checked by the following procedure.

As a typical example in the case where the number of training abnormal data in which an excessive adaptation is liable to occur is extremely small, a case of Q=3 is now considered. Each of three abnormal data has the score NScore with regard to the feature f. Since the score NScore is a score in which the normality which is calculated based on the distribution normalized by the training normal data is used as a reference, the smaller the value of the score is, the higher the abnormality degree is. In this instance, in order to simply check the feature amount, a threshold value T(h) is introduced. The threshold value T(h) is a function by a value h (h≥0) which has previously been designated by the user and is automatically determined by the following equation (9).

$$T(h) = \frac{1}{\sqrt{2\pi}} \exp\left(-\frac{1}{2}h^2\right) \qquad (9)$$

Ordinarily, the proper value of h lies within a range from 2.0 to 3.0. This is because since the model which defines the score NScore is defined so that a mean is normalized by 0 and a variance is normalized by 1, even if all feature amounts are evaluated based on such a threshold value, there will be no problem. The value h may be adaptively determined with reference to results of the following expressions (11), which will be described hereinafter, or the like which are obtained as a result of a threshold value process using the threshold value T(h). It is now assumed that among three abnormal data $A_1$, $A_2$, and $A_3$, it is decided that the abnormal data in which the score NScore shown by each data in the feature amount f satisfies the following expression (10) is data which can be separated by the feature amount f.

$$NScore_{(A_i)_f} \leq T(h) \qquad (10)$$

By deciding by the expression (10), which abnormal data can be separated or cannot be separated can be simply temporarily determined with respect to all of the N features. For simplicity of description, it is assumed that N=11, and in the eleven feature amounts, whether or not each abnormal data could be separated is expressed by 0 or 1. A train of numerals constructed by coupling the N values of 0 and 1 is shown by G and is set for each abnormal data. It is assumed that the train G is obtained as shown by the following expressions (11) for each of the three abnormal data.

$$G_{(A_1)} = (1,0,1,1,0,0,1,0,1,1,0)$$

$$G_{(A_2)} = (1,0,0,1,1,0,0,0,0,0,1)$$

$$G_{(A_3)} = (1,1,0,0,0,0,1,0,0,0,1) \qquad (11)$$

From the expressions (11), for example, with respect to the abnormal data $A_1$, it is judged that it can be separated from the normal data by using any one of the feature amount IDs (1, 3, 4, 7, 9, 10). It is decided that all of $A_1$, $A_2$, and $A_3$ can be probably detected merely by selecting the feature amounts whose IDs are equal to 1 among the eleven features. Therefore, the data having a possibility that the feature amounts which respond to the noises which are not related to the actual abnormality among the feature amounts are mixed are detected as follows.

In the embodiment, the N features are associated with the coordinates at which such features have been extracted as a prerequisite. For example, in the case of the feature amount such as a maximum value (maximum luminance value) in the image, the coordinates at which the maximum luminance has been observed in the image are held. Similarly, all of the eleven extracted feature amounts hold the coordinates which become a ground of each value. Therefore, for example, when all of the feature amounts (1, 3, 4, 7, 9, 10) in which the abnormal data $A_1$ has been separated correctly respond to the abnormal area, all of the coordinates held by those feature amounts indicate similar areas. Assuming that a distance threshold value for deciding whether or not the coordinates of the abnormal area are close is equal to $T_{NN}$, it is possible to decide that when an abnormal candidate area lies within the distance threshold value $T_{NN}$, the same area is shown. By a deciding reference which uses such an area as a ground, the feature amount in which the abnormal data $A_1$ has been separated is classified. If it is assumed that it is understood by such a classifying process that the feature amount IDs (1, 4, 10) decide that a same area $R_1$ is an abnormal area and that the feature amount IDs (3, 7, 9) decide that an area $R_2$ is an abnormal area, the expression regarding $A_1$ in the expressions (11) can be rewritten as shown by the following expression (12).

$$G_{(A_1)}=(1,0,0,1,0,0,0,0,1,0) \text{ or } (0,0,1,0,0,0,1,0,1,0,0) \quad (12)$$

That is, by introducing the abnormal area to the judgment reference, it is shown that there is a possibility that the feature amount in which the abnormality has correctly been separated is a feature amount separated by the noises which are not related to such features that either one of them is correct and the normality and abnormality are separated in one of them. Similarly, it is assumed that the area is automatically used as a reference, and whether all abnormal data to each feature amount can be separated or cannot be separated is expressed again by vectors, so that the numeral trains G are as shown by the following expressions (13).

$$G_{(A_1)}=(1,0,0,1,0,0,0,0,1,0) \text{ or } (0,0,1,0,0,0,1,0,1,0,0)$$

$$G_{(A_2)}=(1,0,0,1,1,0,0,0,0,1)$$

$$G_{(A_3)}=(1,0,0,0,0,0,0,0,0,1) \text{ or } (0,1,0,0,0,0,0,0,0,0) \text{ or } (0,0,0,0,0,1,0,0,0,0) \quad (13)$$

According to the expressions (13), with respect to the abnormal data $A_2$, it will be understood that a result in which inconsistency of the abnormal area did not occur. With respect to the abnormal data $A_3$, it will be understood that there are three points where it has been decided that the area is the abnormal area. Therefore, there are two methods of obtaining a combination showing the feature amount sets which do not respond to the true abnormal signal.

Figure 10:
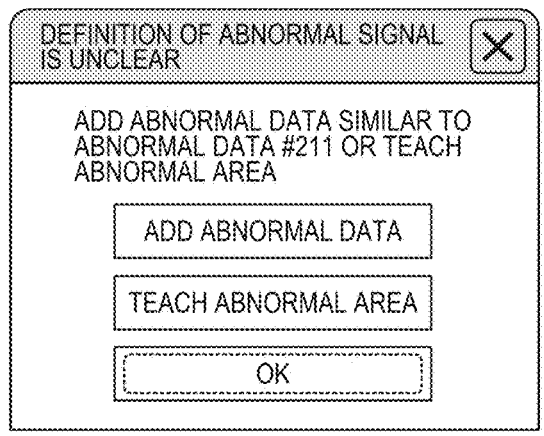
FIG. 10 is a diagram illustrating an example of a message which is displayed when it is detected that there is a possibility of occurrence of an excessive adaptation in the second embodiment.
Figure 11A:
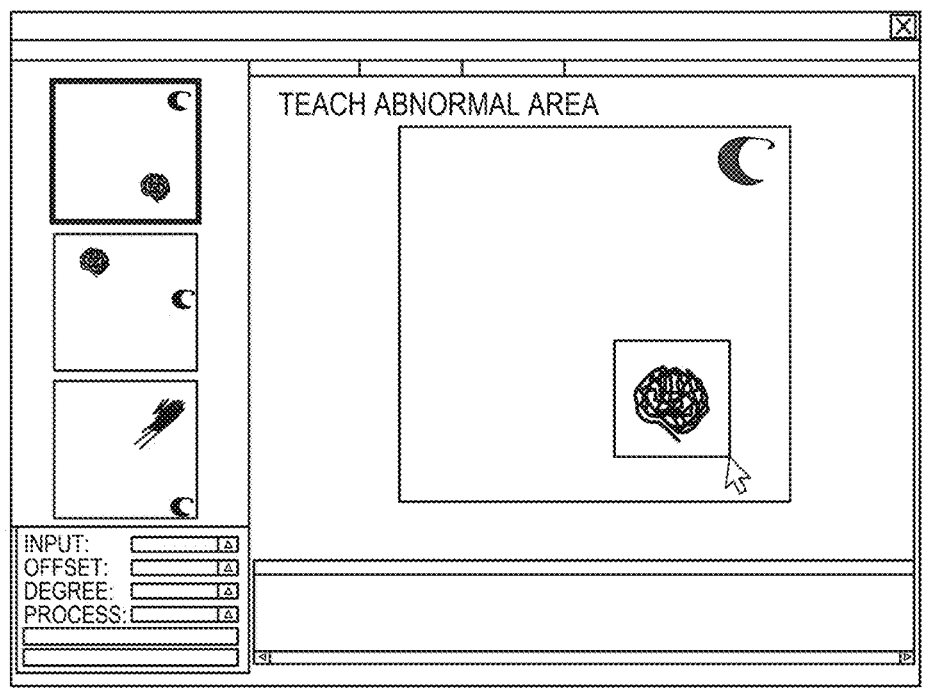
FIGS. 11A and 11B are diagrams illustrating an example of a display screen for allowing the user to inquire of an abnormal area and a display screen for accepting a teaching in the second embodiment.
Figure 11B:
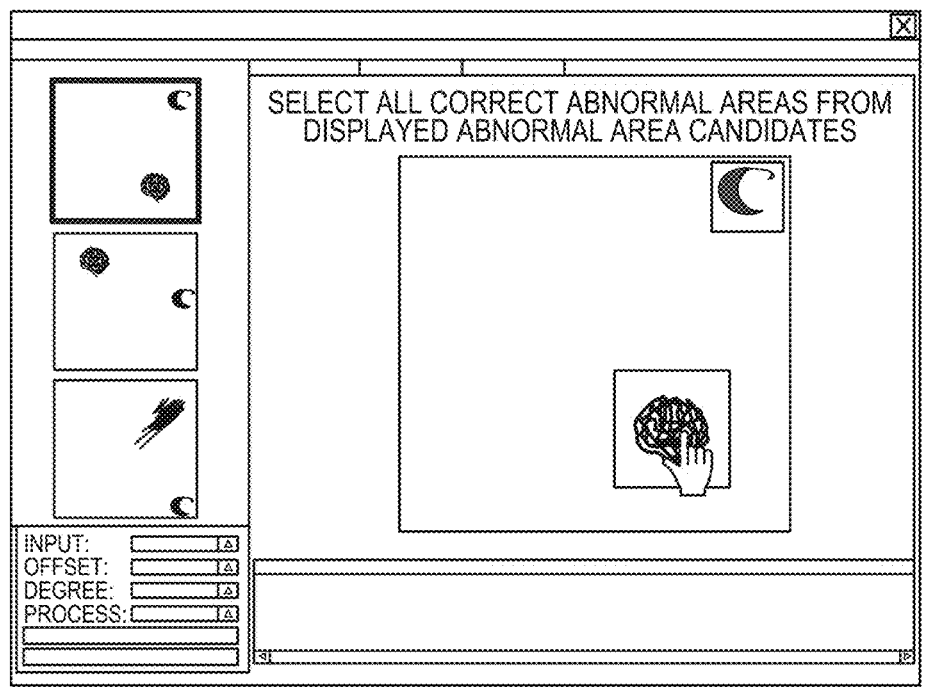

First, one of such methods is a method whereby by urging the user to add training abnormal data similar to $A_1$ and $A_3$, noise features which are not related to the separation of the normal data and the abnormal data are obtained. If similar abnormal data can be soon prepared, it is method which can extremely easily cope with such a case. The other method is a method whereby when a plurality of abnormal area candidates are detected as shown by the expressions (13), the user is inquired about which one is the true abnormal area and a teaching is obtained, thereby coping with such a case. An example of those urging messages is illustrated in FIG. 10. An example of a display screen for teaching a correct abnormal area by a GUI is illustrated in FIGS. 11A and 11B. FIG. 11A illustrates a state where an abnormal area is input by using a pointer by the user's hand, thereby teaching. FIG. 11B illustrates an example in which a plurality of abnormal area candidates are displayed and which one of them is an abnormal area is selected by using a pointer.

Since there is a case where a plurality of abnormal areas exist in the image in dependence on a sample, a plurality of areas can be also selected. Although the method of selecting the abnormal areas has been mentioned as an example here, naturally, a similar teaching effect can be also obtained by a method of teaching positions of the areas different from the abnormal area on the contrary. If the true abnormal area is taught by the above teaching method by the user, a better one of a plurality of effective feature amount candidate sets can be selected. Further, after the abnormal area was correctly taught in FIGS. 11A and 11B, the N feature amounts obtained from only the abnormal area of the image are newly added to the training abnormal data and the N feature amounts obtained from the areas other than the abnormal area are newly added to the training normal data, thereby learning. Thus, the teaching regarding the normal data and abnormal data can be further clarified.

An example of a result in which the valid feature candidates are narrowed from the expressions (13) in accordance with the foregoing procedure is shown by the following expressions (14).

$$G_{(A_1)}=(0,0,1,0,0,0,1,0,1,0,0)$$

$$G_{(A_2)}=(1,0,0,1,1,0,0,0,0,1)$$

$$G_{(A_3)}=(0,1,0,0,0,0,0,0,0,0) \quad (14)$$

The score of the feature amount f by the equation (6) or (8) is re-evaluated based on the expressions (14) and results are shown by the following equations (15) and (16).

$$FScore_f = 1 - \frac{\sqrt{2\pi}}{Q} \sum_{i=1}^{Q} G_{(A_i)_f} \cdot NScore_{(A_i)_f} \quad (15)$$

$$FScore_f = 1 - \frac{P \sum_{i=1}^{Q} G_{(A_i)_f} \cdot NScore_{(A_i)_f}}{Q \sum_{j=1}^{P} NScore_{(B_i)_f}} \quad (16)$$

As mentioned above, the ordering by the feature amount evaluation based on the score obtained by the equation (15) or (16) is performed, the set of feature amounts is selected from the top feature amount, and after that, the model is learned, so that the learning which avoids the excessive adaptation can be guided.

Third Embodiment

Subsequently, the third embodiment of the invention will be described. The third embodiment relates to a method whereby whether or not there is a possibility of occurrence of an excessive adaptation is notified to the user by presenting a result on the way of training or after the training to the user, thereby avoiding in a manner similar to the second embodiment. Points different from the foregoing first and second embodiments will be described hereinbelow.

A problem setting is similar to that in the second embodiment. There is considered such a problem that, in the external appearance inspecting apparatus, an image is input, feature amounts are extracted from the input image, and whether the input image is normal data or abnormal data is classified on the basis of the extracted feature amounts. The third embodiment relates to a method whereby whether or not the feature amount correctly responds to the abnormal signal is detected by the order of the abnormal score. In the foregoing second embodiment, the difference between the areas serving as a ground of the abnormal signal is detected and used for the search of the noise feature. However, for example, even in the case of the feature amount which responds to the same area, if a magnitude of the score does not conform with the actual state, there is a possibility that it responds to the noises. According to the third embodiment, an advantage is obtained even in the case where the extracted feature is not associated with the coordinates of the local area.

Figure 13:
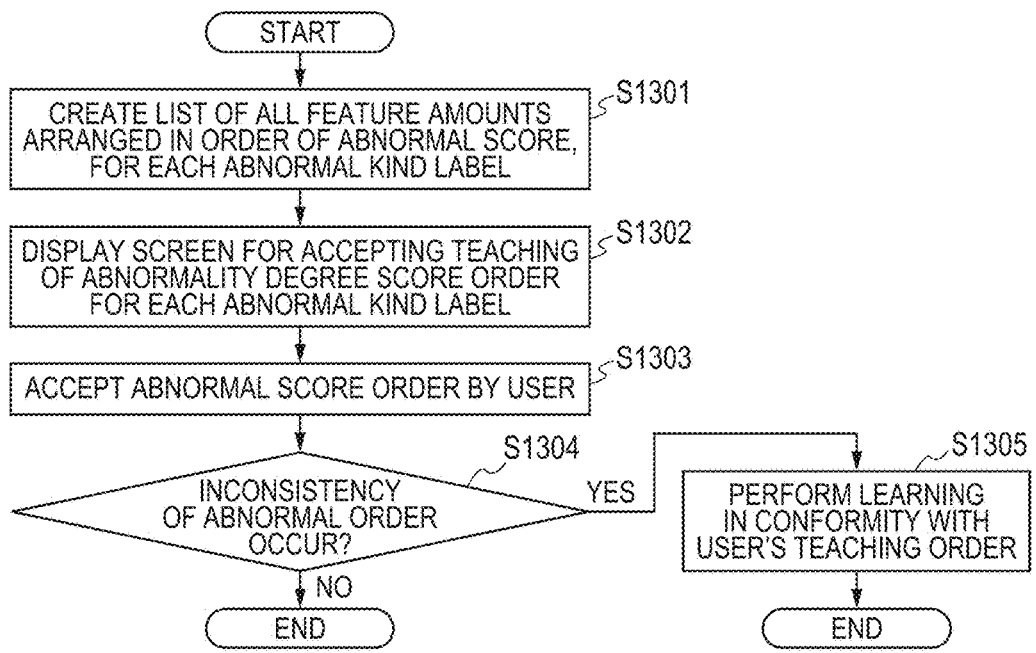
FIG. 13 is a flowchart illustrating an example of the processing operation in the third embodiment.
Figures 14A, 14B, 14C:
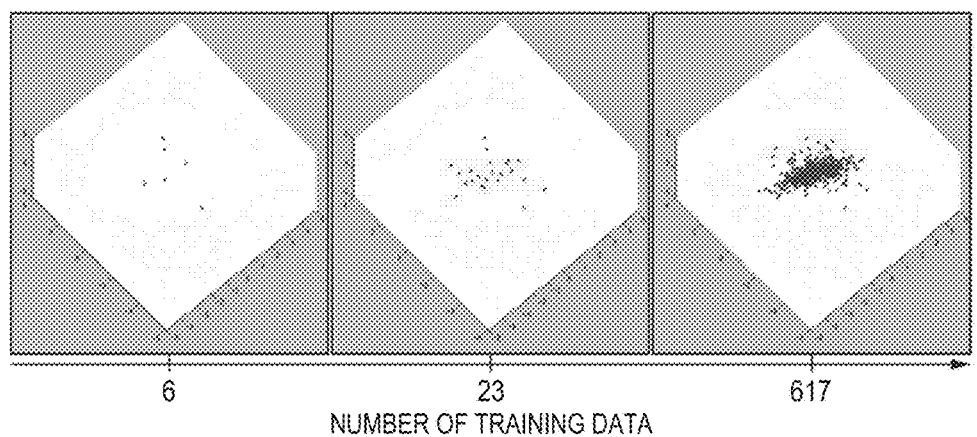
FIGS. 14A, 14B, 14C, 14D, 14E, and 14F are diagrams for describing the excessive adaptation.
Figures 14D, 14E, 14F:
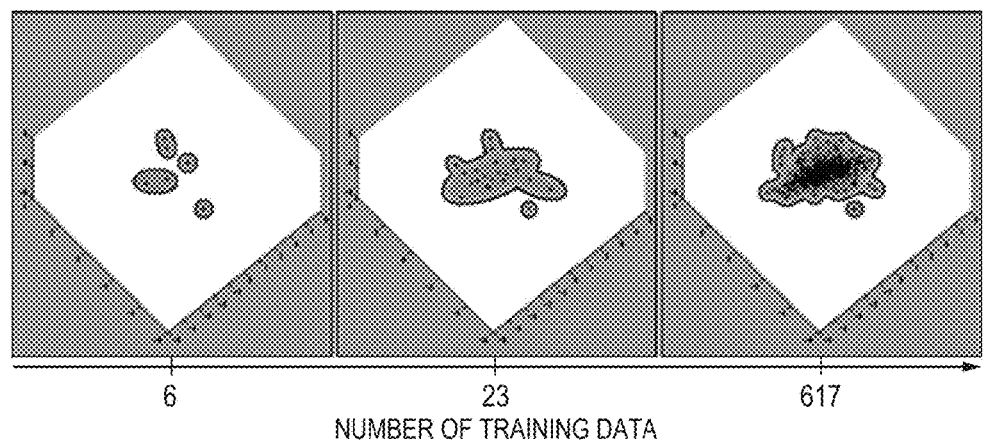

In the third embodiment, the training abnormal data is learned by the setting and procedure similar to those in the second embodiment. However, it is assumed that besides the label showing the abnormality to those training abnormal data, a fact that with respect to the same kind of abnormalities, they are of the same kind is further supplementarily taught. A detailed flow is shown in FIG. 13. FIG. 13 is a flowchart illustrating an example of the processing operation in the third embodiment. In step S1301, a list of all feature amounts arranged in order of abnormal score for each abnormal kind label is created. Subsequently, in step S1302, a screen for accepting the teaching of the abnormal score order is displayed for each abnormal kind label. In step S1303, teaching of the abnormal score order by the user is accepted. In step S1304, whether or not inconsistency of the abnormal orders has occurred is decided. If the inconsistency of the abnormal orders has occurred, in step S1305, the learning is performed in conformity with the order taught by the user.

Figure 12:
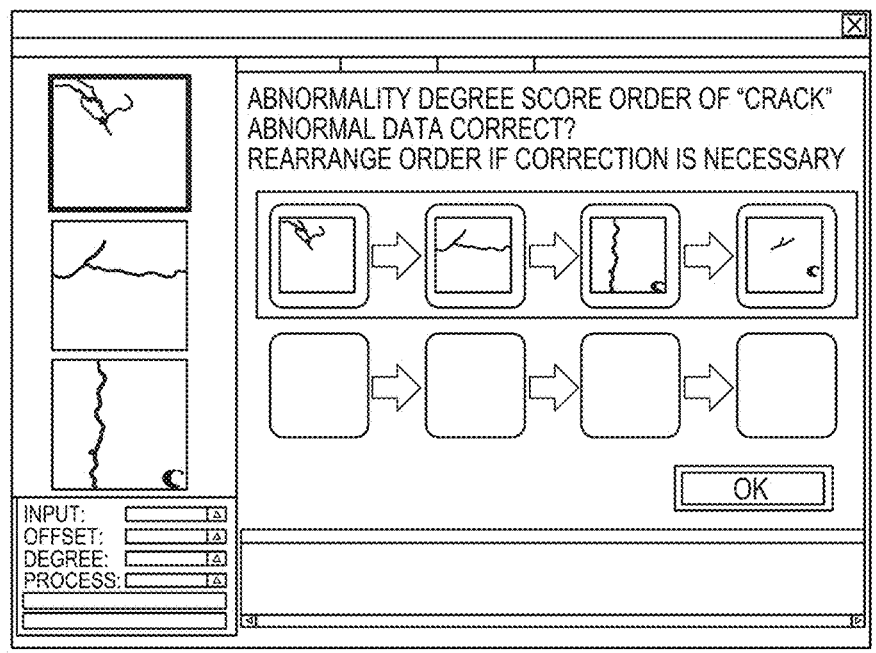
FIG. 12 is a diagram illustrating an example of a display screen for accepting an abnormal score order teaching of the user in the third embodiment.

For example, in the external appearance inspection, there is a case where a name such as scratch, unevenness, crack, or the like is allocated to each abnormality in consideration of a state of appearance such as a shape of abnormality or the like, thereby classifying the abnormality. When the score $FScore_f$ has been given to all of the N features by using the separation degree score, as a ground, by a procedure similar to that in the second embodiment, an abnormal kind label is supplementarily used. The order of the abnormality degree score is taught like a GUI illustrated in FIG. 12 to a part or all of the abnormal data added with the same abnormal kind label. In an example of a display screen illustrated in FIG. 12, a method whereby an example of the abnormal data arranged in the abnormal score order estimated by the apparatus side is presented to the user and the user is allowed to correct them by the user operation is shown as an inputting method. However, the user may select and input them without presenting anything from the apparatus side.

The order is sequentially given to each of the N features from the feature of the lowest score by using the score NScore defined by the equation (4) as a reference. A difference $Pd_f$ between the order list at that time and the order list obtained by the user teaching is calculated by the sum of Hamming distance $D_H(I_A)$ calculated every abnormal kind $I_A$ and is used as a penalty score at the time of evaluation of the feature amount. At this time, the difference $Pd_f$ is obtained by the following equation (17). It is now assumed that there are L kinds of abnormal kind labels and $\omega$ is a variable which is adjustable as a weight for adjusting an influence of the penalty score for each abnormal kind label.

$$Pd_f = \sum_{I_A=1}^{L} \omega_{I_A} \cdot D_H(I_A) \tag{17}$$

By using the value obtained by the equation (17) as a penalty term and introducing into the equations (6), (8), (15), and (16) shown in the second embodiment, the following equation (18) is obtained. In the equation (18), α is a weight variable for adjusting an influence of the whole penalty term. It is sufficient that a value of ω in the equation (17) and a value of α in the equation (18) can be adjusted by the user by a slider control input or the like.

$$FScore_f' = FScore_f - \alpha Pd_f \tag{18}$$

By evaluating the feature amount by the equation (18), an intention of the user is reflected and a mechanism which is difficult to select the noise feature can be created. The case where the information showing the abnormal kind label can be previously used has been described above. However, there is a case where even if the abnormal kind labels are not given as prepared information to many data, among the several abnormal data, the user knows about abnormal data which should be clearly separated from the normal data and other abnormal data. Even in such a case, by giving at least information upon learning, a risk that the noise feature is learned can be suppressed. Such a construction can be accomplished by introducing an idea of a significance degree, which will be described hereinafter.

For example, while there is abnormal data largely regarding a function and a value of a product, abnormal data which is hardly related thereto exists. Therefore, a significance degree γ corresponding to each abnormal data ($A_1$, $A_2$, ..., $A_Q$) is set with respect to all of the training abnormal data as shown by the following expression (19).

$$\gamma = (\gamma_1, \gamma_2, \ldots \gamma_Q) \tag{19}$$

For example, it is assumed that a range of the value of the significance degree γ of the abnormal data lies within a range from 0.0 to 1.0 and initial values of the values of the significance degrees γ of all of the abnormal data are set to 0.5. By constructing in such a manner that the setting of the significance degree of the abnormal data by the user is accepted by a simple slider control input or the like, the significance degrees in the several abnormal data among those abnormal data can be set while increasing or decreasing. By defining the score FScore in such a case as shown by the following equation (20), it can be set to the score to which the intention of the user has been further reflected.

$$FScore_f = 1 - \frac{\sqrt{2\pi} \sum_{i=1}^{Q} \gamma_i \cdot NScore_{(A_i)_f}}{Q \sum_{i=1}^{Q} \gamma_i} \tag{20}$$

Naturally, it may be defined by the following equation (21) as a score in consideration of the distribution of the normal data as shown in the equation (8) in the second embodiment.

$$FScore_f = 1 - \frac{P \sum_{i=1}^{Q} \gamma_i \cdot NScore_{(A_i)_f}}{Q \sum_{i=1}^{Q} \gamma_i \cdot \sum_{j=1}^{P} NScore_{(B_i)_f}} \tag{21}$$

Other Embodiments

The invention is also realized by executing the following processes. That is, software (program) for realizing the functions of the foregoing embodiments is supplied to a system or an apparatus through a network or various kinds of storage media and a computer (or a CPU, MPU, or the like) of the system or apparatus reads out a program and executes processes corresponding to the program.

The foregoing embodiments are nothing but mere examples of embodying the invention and a technical scope of the invention should not be limitedly interpreted by them. That is, the invention can be embodied in various forms without departing from its technical idea or its principal features.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the invention, if it is decided that there is a possibility that an excessive adaptation occurs due to the insufficient training data or other information upon learning, by urging the user to add data or other information, the excessive adaptation can be avoided and the classifying precision can be improved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-006899, filed Jan. 16, 2015, which is hereby incorporated by reference herein in its entirety.

What is claimed is:

1. An information processing apparatus for generating a discrimination model which is used to decide whether or not a target is normal by using learning data, comprising:
one or more processors; and
at least one memory coupled to the one or more processors, the at least one memory having instructions stored thereon which, when executed by the one or more processors, cause the information processing apparatus to:
input a plurality of learning data;
generate a plurality of discrimination models each for a set of learning data which are selected from the input plurality of learning data and decide whether or not a number of the input learning data is insufficient on the basis of a similarity between the discrimination models;
evaluate a degree of overlearning of a particular discrimination model among the discrimination models and, based on a result of the evaluation, decide whether or not a number of the input learning data is insufficient, when generating the particular discrimination model; and
notify a user of information for urging an additional input of new learning data when it is decided that the number of the input learning data is insufficient.

2. An apparatus according to claim 1, wherein when the discrimination models are not similar, and wherein the at least one memory stores further instructions, which when executed by the one or more processors, cause the information processing apparatus to decide that the number of learning data is insufficient.

3. An apparatus according to claim 2, wherein the at least one memory stores further instructions, which when executed by the one or more processors, cause the information processing apparatus to:
if it is decided that the number of learning data in which the discrimination models are not similar is insufficient, notify the user of the learning data which are not included in the partial sets.

4. An apparatus according to claim 1, wherein an area serving as a ground of label information given to the learning data is referred to, and wherein the at least one memory stores further instructions, which when executed by the one or more processors, cause the information processing apparatus to, on the basis of consistency of the referred information, notify the user of a message for urging an addition of the learning data.

5. An apparatus according to claim 1, wherein the at least one memory stores further instructions, which when executed by the one or more processors, cause the information processing apparatus to perform a machine learning on the basis of the learning data added in accordance with the notified information.

6. An apparatus according to claim 1, wherein a normal image and an abnormal image are input as the learning data.

7. An apparatus according to claim 6, wherein the at least one memory stores further instructions, which when executed by the one or more processors, cause the information processing apparatus to:
generate the particular discrimination model on the basis of a plurality of feature amounts extracted from the abnormal image; and
decide whether or not areas of the abnormal image in which each of the feature amounts has been extracted coincide and, if it is decided that the areas do not coincide, decide that the number of the input learning data is insufficient.

8. An apparatus according to claim 1, wherein the at least one memory stores further instructions, which when executed by the one or more processors, cause the information processing apparatus to:
obtain the generated particular discrimination model; and classify an input image on the basis of the input image and the particular discrimination model.

9. An information processing method of generating a discrimination model which is used to decide whether or not a target is normal by using learning data, comprising:
inputting a plurality of learning data;
generating a plurality of discrimination models each for a set of learning data which are selected from the input plurality of learning data and decide whether or not a number of the input learning data is insufficient on the basis of a similarity between the discrimination models;
evaluating a degree of overlearning of a particular discrimination model among the discrimination models;
based on a result of the evaluation, deciding whether or not a number of the input learning data is insufficient, when the particular discrimination model is generated; and
notifying a user of information for urging an additional input of new learning data when it is decided that the number of the input learning data is insufficient.

10. A non-transitory computer-readable storage medium storing a program for causing a computer to execute an information processing method of generating a discrimination model which is used to decide whether or not a target is normal by using learning data, wherein the method comprises:
inputting a plurality of learning data;
generating a plurality of discrimination models each for a set of learning data which are selected from the input plurality of learning data and decide whether or not a number of the input learning data is insufficient on the basis of a similarity between the discrimination models;
deciding whether or not the number of the input learning data is insufficient, when a particular discrimination model among the discrimination models is generated; and
notifying a user of information for urging an additional input of new learning data when it is decided that the number of the input learning data is insufficient.

11. An information processing apparatus for generating a discrimination model which is used to decide whether or not a target is normal by using learning data, comprising:
one or more processors; and
at least one memory coupled to the one or more processors, the at least one memory having instructions stored thereon which, when executed by the one or more processors, cause the information processing apparatus to:
input a plurality of learning data;
generate a plurality of discrimination models each of which is used to decide whether or not the target is normal on the basis of the learning data;
decide whether or not a number of the learning data which were input is insufficient when the discrimination model is generated; and
notify a user of an example of the data of a kind which should be input as new additional learning data when it is decided that the number of the input learning data is insufficient.

12. An information processing method of generating a discrimination model which is used to decide whether or not a target is normal by using learning data, comprising:
inputting a plurality of learning data;
generating a plurality of discrimination models each of which is used to decide whether or not the target is normal on the basis of the learning data;
deciding whether or not a number of the input learning data is insufficient when the discrimination model is generated; and
notifying a user of an example of the data of a kind which should be input as new additional learning data when it is decided that the number of the input learning data is insufficient.

13. A non-transitory computer-readable storage medium storing a program for causing a computer to execute an information processing method of generating a discrimination model which is used to decide whether or not a target is normal by using learning data, comprising:
inputting a plurality of learning data;
generating a plurality of discrimination models each of which is used to decide whether or not the target is normal on the basis of the learning data;
deciding whether or not a number of the input learning data is insufficient when the discrimination model is generated; and
notifying a user of an example of the data of a kind which should be input as new additional learning data when it is decided that the number of the input learning data is insufficient.

* * * * *